United States Patent
Chang et al.

(10) Patent No.: US 8,655,812 B2
(45) Date of Patent: *Feb. 18, 2014

(54) NON-INTRUSIVE EVENT-DRIVEN PREDICTION

(75) Inventors: Hung-yang Chang, Watson, NY (US); Joachim H. Frank, Somers, NY (US); Christoph Lingenfelder, Yorktown Heights, NY (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,680

(22) Filed: Jul. 16, 2012

(65) Prior Publication Data

US 2013/0024413 A1    Jan. 24, 2013

Related U.S. Application Data

(63) Continuation of application No. 12/859,243, filed on Aug. 18, 2010, now Pat. No. 8,468,107.

(51) Int. Cl.
| | |
|---|---|
| G06F 15/16 | (2006.01) |
| G06F 17/00 | (2006.01) |
| G06Q 10/00 | (2012.01) |
| G06N 3/04 | (2006.01) |
| G06N 5/04 | (2006.01) |
| G06Q 30/02 | (2012.01) |

(52) U.S. Cl.
CPC .............. *G06N 3/049* (2013.01); *G06N 5/047* (2013.01); *G06Q 30/02* (2013.01)
USPC ............................... 706/21; 706/48; 705/1.1

(58) Field of Classification Search
None
See application file for complete search history.

(56) References Cited

U.S. PATENT DOCUMENTS

| | | |
|---|---|---|
| 2006/0161471 A1 | 7/2006 | Hulen et al. |
| 2008/0183562 A1 | 7/2008 | Ramachandran et al. |
| 2010/0023362 A1 | 1/2010 | Nguyen et al. |

OTHER PUBLICATIONS

Wetzstein et al; Monitoring and Analyzing Influential Factors of Business Process Performance, 2009 IEEE DOI 10.1109/EDOC. 2009.18, 141-150.
Azvine et al; Real Time Business Intelligence for the Adaptive Enterprise, Proceedings of the 8th IEEE International Conference on E-Commerce Technology and the 3rd IEEE International Conference on Enterprise Computing, E-Commerce, and E-Services, CEC/EEE'06, 0-7695-2511-3/06, 2006.
Han et al; Two-stage Process Analysis Using the Process-based Performance Measurement Framework and Process Simulation, 2007 IEEE DOI, 31-37.
Peng et al; A Semi-automatic System with an Iterative Learning Method for Discovering the Leading Indicators in Business Processes, 2007 ACM SIGKDD Workshop on Domain Driven Data Mining, DDDM2007, Aug. 12, 2007, 33-42, San Jose, California, USA.

*Primary Examiner* — Alan Chen
(74) *Attorney, Agent, or Firm* — Garg Law Firm, PLLC; Rakesh Garg; Libby Z. Toub

(57) ABSTRACT

A method for non-intrusive event-driven prediction of a metric in a data processing environment is provided in the illustrative embodiments. At least one set of events is observed in the data processing environment, the set of events being generated by several processes executing in the data processing environment. A subset of the set of events are tracked for an observation period, the tracking resulting in bookkeeping information about the subset of events. A pattern of events is detected in the bookkeeping information. The pattern is formed as a tuple representing a process in the several processes, the metric corresponding to the process. A prediction model is selected for the tuple. The prediction model is supplied with the tuple and executed to generate a predicted value of the metric.

10 Claims, 5 Drawing Sheets

NON-INTRUSIVE EVENT-DRIVEN PREDICTION

RELATED APPLICATION

The present application is a CONTINUATION of and commonly assigned U.S. patent application Ser. No. 12/859,243 filed Aug. 18, 2010, now U.S. Pat. 8,468,107.

BACKGROUND OF THE INVENTION

1. Field of the Invention

The present invention relates generally to a computer implemented method for predicting business metrics in a data processing environment. More particularly, the present invention relates to a computer implemented method for non-intrusive event-driven prediction in a data processing environment configured for business monitoring.

2. Description of the Related Art

In decision-making processes of a business, predicted values of certain business metrics are used for planning, budgeting, detecting errors, and many other purposes. For example, a business metric may be quarterly budget deficit that has been recorded for several quarters. The budget deficit (or surplus) of past quarters is often used as a basis for predicting budget deficits or surpluses for future quarters.

Certain metrics are called key performance indicators (KPI). Metrics, such as quarterly budget deficit or cost of a business operation, are measured and recorded periodically during the operation of a business process. The historical information of a metric is used for predicting the value of the metric at some time in the future. A KPI is an aggregation of a metric, for example, an average value of a metric over a period of one month.

A metric, including a KPI, is defined specifically for the process whose performance is being measured or predicted. Accordingly, detailed knowledge of the business process is necessary for the metric to be selected, observed, recorded, and forecasted properly. For example, cost of processing a claim may be a metric, but how that metric is to be measured and how that metric is to be predicted depends on which business process' cost of processing the metric represents. In other words, a metric that represents an insurance business' cost of processing a claim metric may be very different from a metric that represents a product manufacturer's cost of processing a claim.

SUMMARY OF THE INVENTION

The illustrative embodiments provide a method for non-intrusive event-driven prediction of a metric in a data processing environment. An embodiment observes a set of events in the data processing environment, the set of events being generated by several processes executing in the data processing environment. The embodiment tracks a subset of the set of events for an observation period, the tracking resulting in bookkeeping information about the subset of events. The embodiment detects a pattern of events in the bookkeeping information. The embodiment forms the pattern as a tuple representing a process in the several processes, the metric corresponding to the process. The embodiment selects a prediction model for the tuple. The embodiment supplies the prediction model with the tuple and executes the prediction model to generate a predicted value of the metric.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The invention recognizes that presently, predicting a metric relies heavily on the knowledge of the underlying business process to which the metric pertains. The invention further recognizes that present prediction techniques often predict aggregate values based on historic aggregate values.

For example, an aggregate budget deficit for a future quarter is predicted based on aggregate budget deficits of past quarters. An aggregate metric is a metric that comprises several components which contribute in some respect to the value of that metric. Thus, an aggregate value (of a metric) is a function of the values of several components that form the metric.

Some prediction models do consider the values of the components of the metric. For example, a stock market index value may be a metric that is predicted based on the performance of the component stocks of that index. However, the invention recognizes that such prediction models rely heavily on the knowledge of the processes that generate the component values of the aggregate metric. For example, the stock market index value cannot be predicted without knowing how the component stocks are combined into the index, the industry or business factors to consider for each component stock, and the process for accommodating a change in the composition of the index.

Thus, the invention recognizes that the prior art prediction processes either predict aggregate metrics based on historical aggregate values, or rely on the detailed knowledge of the business process, application, or algorithm (collectively, business process(es)) underlying the metric, or both. The invention recognizes that the aggregate metric prediction model does not account for changes in the components of the aggregate. The invention further recognizes that whether or not the components are considered in prior art prediction models, the prior art prediction models are intrusive in that such models have to be configured according to the operation details of the specific business processes underlying the metric or a component thereof.

The illustrative embodiments used to describe the invention generally address and solve the above-described problems and other problems related to prediction models. The illustrative embodiments of the invention provide a method for non-intrusive event-driven prediction in a data processing environment. An embodiment of the invention predicts a metric's value based on events that directly or indirectly influence the metric. The events may be generated by any business process in any manner and during any suitable operation.

For predicting a metric's future value based on a set of events, an embodiment does not require knowledge of who or what is generating an event in the set, or how or why the event is being generated. An event is a message in a data processing environment that informs of a change in the data processing environment. A set of events is one or more events in any order with an event repeating any number of times in the set without limitation. A set of events may be a multi-set (set of sets) of events and their associated distinguishing parameters, such as a time of occurrence.

Events may include but may not be limited to beginning execution of a process, ending execution of a process, starting a process step, completing a process step, failing a process, failing a step, suspension of a process or thread, a data request, a status change of data, a message, memory or file update, accessing of memory or data, launching of an application, receipt of an input, or production of an output. Generally, an event may be configured to indicate any occurrence of change or activity in a data processing environment within the scope of the invention.

Furthermore, an event in a data processing environment may be raised, recorded, or communicated in any manner suitable for a particular implementation. For example, and without implying a limitation on the invention, an event may be a message in the form of a data structure, a bit flag set in memory, a file written to disk, a page loaded into memory, a keystroke received, a page displayed, a command sent, or an instruction received. Other types of events may be conceivable from this disclosure to those of ordinary skill in the art and the same are contemplated within the scope of the invention.

According to an embodiment of the invention, an event may be characterized by any aspect of the event, including but not limited to the form, content, value, source, destination, dependency, duration, periodicity, priority, or severity of the event. Other ways of characterizing events may be conceivable from this disclosure to those of ordinary skill in the art and the same are contemplated within the scope of the invention.

The illustrative embodiments are described with respect to data, data structures, events, and identifiers only as examples. Such descriptions are not intended to be limiting on the invention. For example, an illustrative embodiment described with respect to specific set of events (tuple) may be implemented using a combination of several sets or tuples of events, in a similar manner within the scope of the invention.

Furthermore, the illustrative embodiments may be implemented with respect to any type of data processing system. For example, an illustrative embodiment described with respect to an application in a data processing system may be implemented with respect to one or more applications executing in a distributed data processing environment within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to numeric attributes may be implemented using alphanumeric attributes, symbolic attributes, or a combination thereof, in a similar manner within the scope of the invention.

An application implementing an embodiment may take the form of data objects, code objects, encapsulated instructions, application fragments, drivers, routines, services, systems—including the basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terms are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, events, activities, and manipulations will be conceivable from this disclosure for similar purposes and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
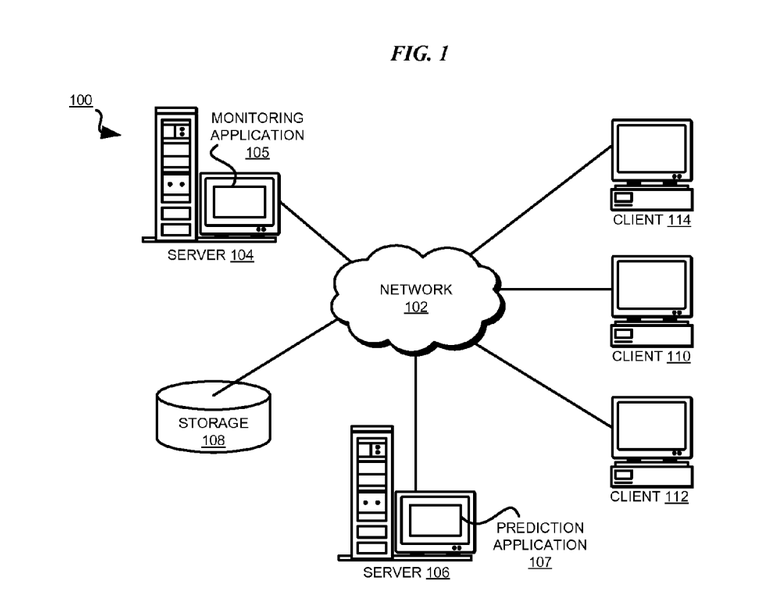
FIG. 1 depicts a pictorial representation of a network of data processing systems in which the illustrative embodiments may be implemented.
Figure 2:
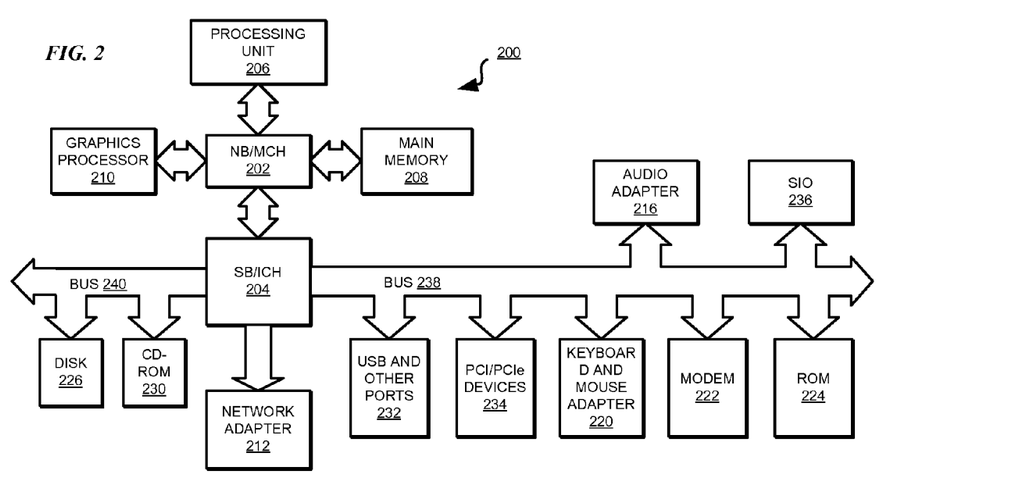
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include monitoring application 105. Monitoring application 105 may monitor events occurring in a data processing environment. Server 106 may include prediction application 107. Prediction application 107 may be one example form of implementing an illustrative embodiment. For example, in one embodiment, prediction application 107 may be a modification of an existing monitoring application 105. In another embodiment, prediction application 107 may communicate with monitoring application 105 over network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interaction between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the business processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
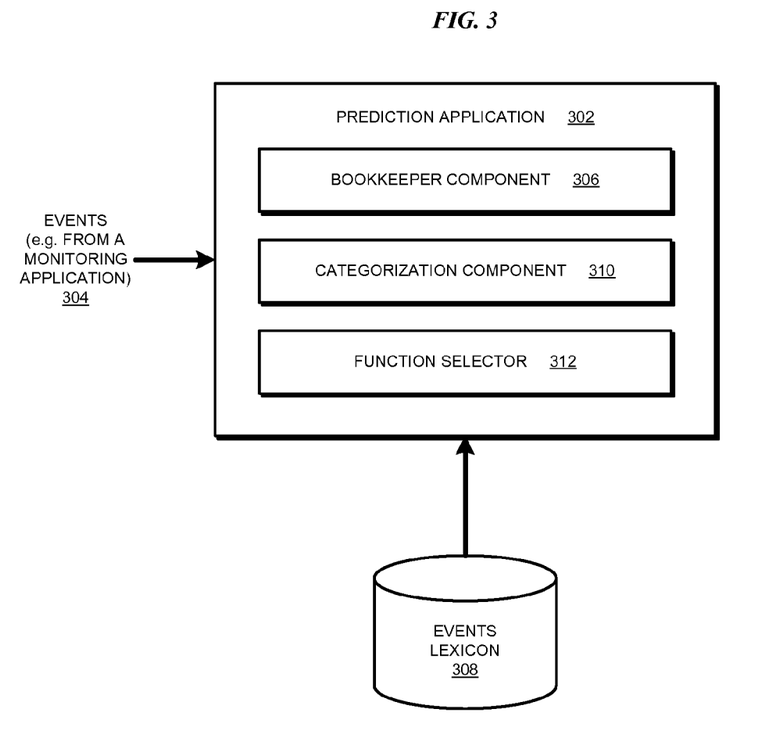
FIG. 3 depicts a block diagram of an example configuration of a prediction application in accordance with an illustrative embodiment.

With reference to FIG. 3, this figure depicts a block diagram of an example configuration of a prediction application in accordance with an illustrative embodiment. Prediction application 302 may be used as prediction application 107 in FIG. 1.

Prediction application 302 receives events 304. Prediction application 302 may listen for events 304 in a data processing environment, or may receive events 304 from another application, such as monitoring application 105 in FIG. 1.

Bookkeeper component 306 tracks events 304 specified in events lexicon 308. Events lexicon 308 may be any manner of specifying which events are of interest to prediction application 302, or for specifying one or more selection criterion for selecting events of interest. For example, several applications may be executing in a given data processing environment and generating events. Even the operating system of a data processing system may be generating some events. As an example, prediction application 302 may be responsible for predicting costs associated with certain transactions, such as processing insurance claims.

Therefore, of all the events in the data processing environment, prediction application 302 may be configured to listen for or handle only certain events and ignore others. In the insurance claim example, prediction application 302 may be configured to handle only certain events that may indicate some aspect of insurance claims handling, such as the events generated by an insurance claims processing workflow. Such events can be configured in events lexicon 308. Prediction application 302 handles events specified in events lexicon 308 and may ignore other events from events 304.

Bookkeeper component 306 may track events from events 304 for any number of event behaviors. For example, bookkeeper component 306 may track and determine which events specified in events lexicon 308 have occurred how many times, in what sequence, and with what frequency.

For example, using the insurance claim example, claim review, claim approval, claim denial events may be specified in events lexicon 308. Accordingly, bookkeeper component 306 may determine that in a given period, claim review event has occurred once, followed by a claim approval event. In another period, bookkeeper component 306 may determine that the claim review event has occurred three times in a day, followed by a claim denial event.

Note that in so tracking, bookkeeper component 306, or prediction application 302 in general, does not need to know how a claim is processed, or that the claim is an insurance claim that follows a certain process. Bookkeeper component 306 simply tracks the specified events as they occur in the data processing environment. For example, if a "legal review" event were additionally specified in events lexicon 308, bookkeeper component 306 may also determine that not only does the claim review event occur three times in a day, a legal review event also occurs the same day following the third claim review event before the claim denial event occurs.

Categorization component 310 generates tuples of event occurrences that may have significance in the given data processing environment. For example, E1, E2, E3, . . . , Ex may be different events relating to insurance claims processing. E1, E2, E3, . . . , Ex may be specified in events lexicon 308 as events to track.

According to the bookkeeping (tracking) done for these events by bookkeeper component 306, categorization component 310 may determine that during an insurance claim processing some or all of these events occur in some pattern. For example, categorization component 310 may generate tuple (1, 0, 3, . . . , 0) indicating that E1 occurs once, E2 does not occur, E3 occurs three times, and so on, with Ex not occurring. An event may not occur, may not be of interest, and may be ignored for a tuple to have a 0 value in this example.

Categorization component 310 may look not only for the count and sequence of events, but also for the timing between the events. For example, certain time periods may be defined using Base 2 as follows—

$-2 \rightarrow 0.125\text{-}0.25$ sec
$-1 \rightarrow 0.25\text{-}0.5$ sec
$0 \rightarrow 0.5\text{-}1$ sec
$1 \rightarrow 1\text{-}2$ sec
$2 \rightarrow 2\text{-}4$ sec
$3 \rightarrow 4\text{-}8$ sec
. . .
$10 \rightarrow 512\text{-}1024$ sec
$11 \rightarrow 1024\text{-}2048$ sec
. . .

Bookkeeper component 306 may inform categorization component 310 that during a given period, E1 occurred, another E1 occurred 12 seconds thereafter, followed by E3 42 hours thereafter, followed by E1 45 minutes thereafter, and followed by E5 2 hours thereafter. Categorization component 310 may form a tuple (E1, 4, E1, 18, E3, 12, E1, 13, E5) to represent this temporal aspect of the above example event pattern.

The above example timing separation is described only as an example without being limiting on an illustrative embodiment. Other schemata, such as equidistant time intervals, will be apparent from this disclosure to those of ordinary skill in the art and the same are contemplated within the scope of the invention.

In a given environment, many processes, entities, applications, and instances (collectively, object(s)), either similar or distinct, may generate events. Furthermore, an object may produce an event that is similar to another event produced by another object, possibly having a different meaning or context. Therefore, an embodiment may be configured to listen to or collect events for particular objects, while ignoring the events from other objects.

Furthermore, ignoring or tracking an event, whether by count, by sequence, by time, or by a combination thereof, need not be absolute. An event may be deemed as not affecting a process or metric if some condition is not met, for example, a threshold is not satisfied. Accordingly, bookkeeper component 306 or categorization component 310 may exclude an event if the event does not satisfy the threshold.

For example, a threshold may be that in five repetitions of a pattern of events, an event has to occur at least three times in the same position to be considered a factor in the metric for which the tuple is being computed. As another example, another threshold may be that an event has to occur within the same duration window relative to another event at least five times in a week's observations to be considered a factor in the metric for which the tuple is being computed. Many other thresholds may be similarly conceived in any given implementation within the scope of the invention. Furthermore, more than one condition, such as different thresholds, may be used concurrently in computing a tuple.

Many other forms of tuples can be computed within the scope of the invention, such as to include, exclude, repeat, or make optional an event; make duration window flexible between events; or nest sequencing, count, or timing aspects of events in a tuple.

For example, in the above example case, (E1, (1 or 10 or 20 E2), 4 E3) may be another representation of the process that may allow E2 to occur within the $1^{st}$, $10^{th}$, or $20^{th}$ defined duration window from E1.(E1, 3(10, E2), 4 E3) may allow up to three occurrences of E2 within the $10^{th}$ defined duration window from E1, followed by E3 at the $4^{th}$ window. One embodiment may further compute tuple (E1, 3 (10, E2), 4, E3, . . . 1, E5), further implying that E4 does not occur following E3, and E3 is followed by E5 after a time-span in the $1^{st}$ duration window. Another embodiment may allow an interpretation of the same tuple as—E4 may occur arbitrarily after E3 and may be followed by E5 at the $1^{st}$ duration window. These examples are selected only to illustrate the operation of categorization component 310 and not as limitations on the invention.

Function selector 312 may select a suitable prediction algorithm for predicting a metric using a tuple. Many prediction algorithms currently exist and an implementation may design its own prediction algorithm. Any such prediction algorithm may be selected in conjunction with a given tuple to generate a predicted value of a metric. Function selector 312 may include logic that assists function selector 312 in determining which prediction algorithm to select for a given tuple. For example, prediction algorithm 'A' may be more suitable for a tuple if the tuple includes temporally related events, whereas prediction algorithm 'B' may be more suitable for tuples with optional events.

Any suitable selection logic may be incorporated in function selector 312 so that function selector 312 outputs a prediction model. A prediction model output from function selector 312 may take the form of "fn(tuple)" where "fn" is a prediction algorithm, which can be used to compute a predicted value of a metric based on data reported in the events.

The predication algorithm, for each characteristic tuple, may be learned using data reported in event sequences classified by this tuple, and the known outcomes of the process execution that produced those events. For example, in the insurance claims process, the data reported in the events may be the claim value, the age of the claimant, the time and place of the accident, and other similar data which may be available as event parameters. A desired metric value may be the outcome.

However, learning a single prediction function for universal or generalized application may lead to sub-optimal results. As another embodiment, the tuples that describe the event sequences can be used to index a family of prediction functions. For example, the data from all processes that produced (E1, 4, E3) may be used to train prediction function f1. The data from all processes that produced (E1, 3, E2, 12, E3) may be used to train another predication function f2. To predict a metric for a process in progress, the prediction function corresponding to the process' event tuple may be used. Note that these tuples can grow as the process proceeds, and accordingly the prediction function can change and become increasingly precise as the process progresses.

The amount of information about an object increases with the number of events recorded about the object. The training may begin with some initial information, such as the age of the claimant or the time of accident, and each event may add more information, such as the event's delay characteristics with respect to the previous event.

In particular, making the prediction from a sequence (E1, x, E2) may be less accurate than the prediction from (E1 x E2 y E3). The choice/selection of a predictive model or function can depend on the tuple itself. It is an implementation choice within the scope of the invention, how many predictive models to use and for what subsequences. Note further that for the purpose of selecting the predictive model, sub-sequences need not be matched exactly. An example logic may take the following form, a) if (A [6-8] E2 x E3) then use model M1 b) else if (A y E2) then]use model M2

Here, A can be any event, x and y any durations and [6-8] any duration between 32 seconds and 4 minutes 16 seconds.

The counting method according to an embodiment may represent E1, E1, E2 and E1, E2, E1 as the same tuple, with counts (2, 1) for E1 and E2. The sequencing method may represent the same two tuples as two different tuples, namely (E1, E1, E2) and (E1, E2, E1). Thus, different embodiments may provide coarse or fine-grained categorization of event sequences in a given environment.

In general, the invention does not prevent extending the matching process of an embodiment described above to n repetitions of the same event or subsequence of events, existence of an event in any position, or other variations in event occurrences. Generally, any suitable mechanism may be adopted in conjunction with an illustrative embodiment for determining a model for any given event sequence.

Figure 4:
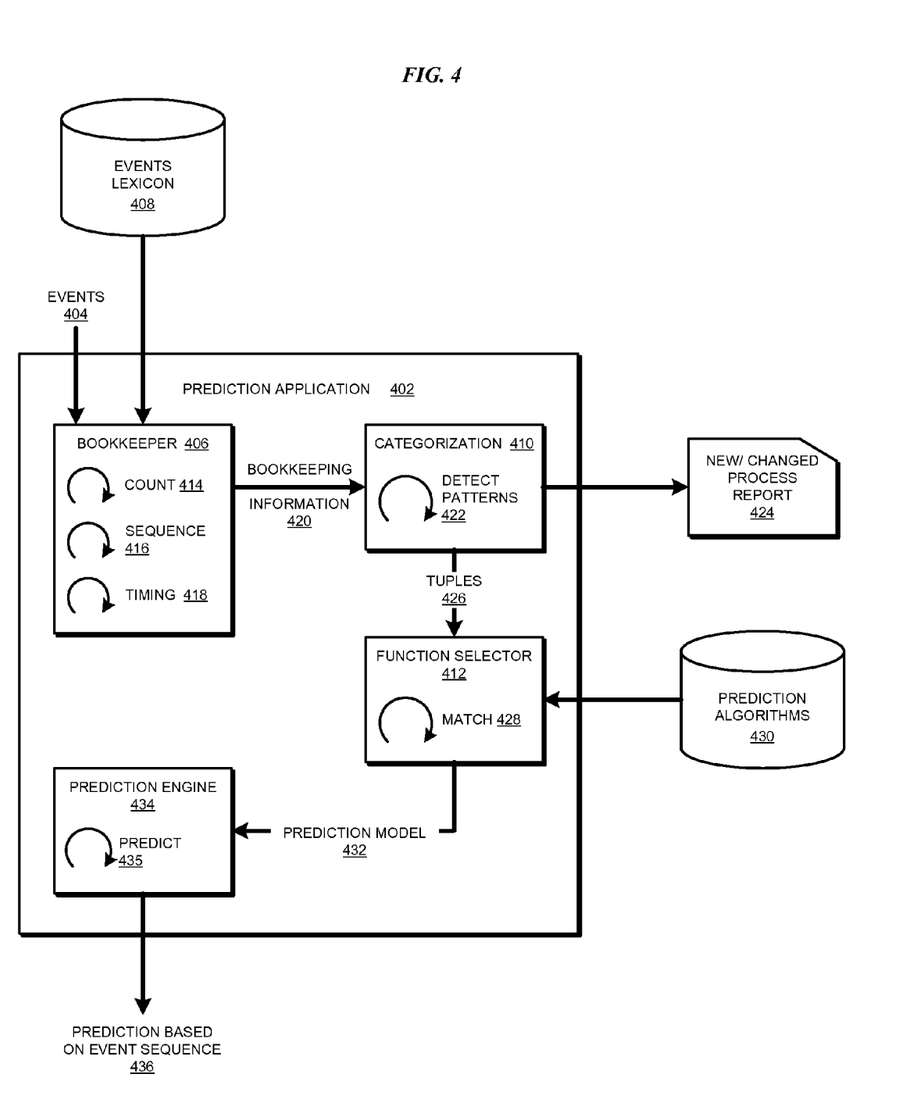
FIG. 4 depicts a block diagram of another example configuration of a prediction application in accordance with an illustrative embodiment.

With reference to FIG. 4, this figure depicts a block diagram of another example configuration of a prediction application in accordance with an illustrative embodiment. Prediction application 402 may be used as prediction application 302 in FIG. 3. Events 404, bookkeeper component 406, events lexicon 408, categorization component 410, and function selector 412 may each be similar to their corresponding artifacts in FIG. 3.

Only as an example, bookkeeper component 406 is depicted as performing the tracking of events 404 using event counting 414, event sequencing 416 and event timing 418 methods. Events 404 may be tracked using a combination of more than one tracking methods, including but not limited to counting 414, sequencing 416, and timing 418.

Bookkeeping information 420 includes the tracking information of events specified in events lexicon 408 as they may have occurred during an observation period. An observation period may be a period during which the execution of certain processes, workflows, applications, threads, programs, or communications may be observed for events 404.

Based on bookkeeping information 420, categorization component 410 performs pattern detection and tuple computation 422. If prediction application 402 has been executing for some time with events lexicon 408, it is likely that certain tuples may already exist as previously identified. During detection and tuple computation 422, categorization component 410 may detect new tuples indicating new processes or a change in the logic of an existing process, which leads to new event patterns. The new or changed tuples may be output from prediction application 402 as new/changed process report 424.

An embodiment may be enhanced by applying a clustering algorithm to all the event sequences that were detected up to some point in time. Such an enhancement may allow grouping event sequences into sets of similar sequences to which the same prediction model may apply.

Furthermore, an embodiment may switch from a learning phase to a prediction phase at some point in time. After such time, a tuple maps to some prediction function. Generic pattern prediction function may also be specified to handle new or erratic tuples for which sufficient training data has not been available in the past. Using a continuously learning and clustering algorithm, an embodiment may be able to detect event patterns for which not sufficient training data has been available and hence the learning phase continues, as well as event patterns for which sufficient training data has been available and hence a prediction can be made.

Continuously learning can also be considered a prediction model quality management function of an embodiment. Real value and prediction value can be compared, to evaluate the quality of the selected prediction model. When a quality parameter is not satisfied, prediction model may be re-created using new training.

Categorization component 410 provides tuples 426 to function selector 412. Function selector 412 matches 428 a tuple from tuples 426 with a prediction algorithm. Prediction algorithms 430 may be a repository of any type that may provide the code, pseudo code, or logic of one or more prediction algorithms. In one embodiment, prediction algorithms 430 may be a collection of services that can be called to execute an implementation of a prediction algorithm with a part of a tuple acting as a parameter for the algorithm.

Prediction model 432 provides the code, pseudo code, or logic of a prediction algorithm matched with a suitable tuple from tuples 426. Prediction model 432 may include any number of such models, such as code for calling different prediction algorithms with different tuples.

Prediction can be performed in 2 phases, a learning phase that uses many event sequences for which the final value of a metric is already known; and an application (or scoring) phase, where a selected one of these models is applied to an individual event sequence in order to predict the final value of said metric. The learning phase results in one or more predictive models. FIG. 4 assumes that the learning phase (not shown) has been performed earlier, said models are stored as prediction algorithms 430, which are also referred to as "Prediction Models" or "Predictive Models". Function selector 412 may select one of the models from 430 and pass the selected model together with the event sequence to prediction engine 434, which predicts the final metric value.

Prediction engine 434 predicts 435 a metric value based on prediction model 432. Extrapolation is depicted as an example prediction technique, and not as a limitation on the invention. For example, given the tuple representation of an instance of an insurance claims process, and given a suitable prediction model, a value of the metric of estimated cost of processing an insurance claim may be extrapolated or predicted.

Prediction engine 434 thus outputs prediction 436. Note that prediction 436 is based only on the observation of events specified in event lexicon 408 and not on the knowledge of any particular application, process, or system. Changing event lexicon 408 can readily adapt prediction application 402 to another domain, such as for predicting cost of constructing a building, or estimating time to market for a new product.

An event can include other state variables, including but not limited to other metrics, before and/or after the event. The values of these state variables as well as the sequence and times of events can all contribute to the model selection and the model contents. Information reported along with the events in this manner, for example in insurance claims processing, the claim value, the claimant's personal information, the time and place of accident, and the make and model of car, may be retained in a monitoring context for a particular process' execution. Such information may also be accompanied by other information, such as temporal information, for example, the duration from claim-received step to the claim-reviewed step, which may also be similarly usable in the monitoring context. While the event sequence classification leads to selecting different functions, as described above, such information, state variables, metrics, or other data accompanying an event may also be used as parameters of a prediction function within the scope of the invention.

Furthermore, an identifier that is transmitted as part of the event can be used to pinpoint the entity at which, or for which, the event occurred. For example, events about stock trades may carry a ticker symbol, events about insurance claim processing may be correlated by claim number. In some cases, several correlation identifiers are needed, either together (for example: events pertaining to a commercial flight may have to report the flight number and the date to pinpoint a flight) or in succession (for example, events pertaining to a fulfillment process may be correlated by order number up to the point where an invoice was sent, and by invoice number throughout the financial settlement phase). Therefore, within the scope of the invention, an event correlation can be applied to divide the incoming event stream into sub-streams pertaining to the same entity or process execution before the pattern detection starts. Additionally, the correlation identifiers that are used to divide the event stream into sub-streams pertaining to the same entity, can also be used to label the prediction value. For example, predicted closing price of NYSE:IBM; predicted arrival time of DL602 on July 12, 2010; or predicted cost of claim 12345.

Figure 5:
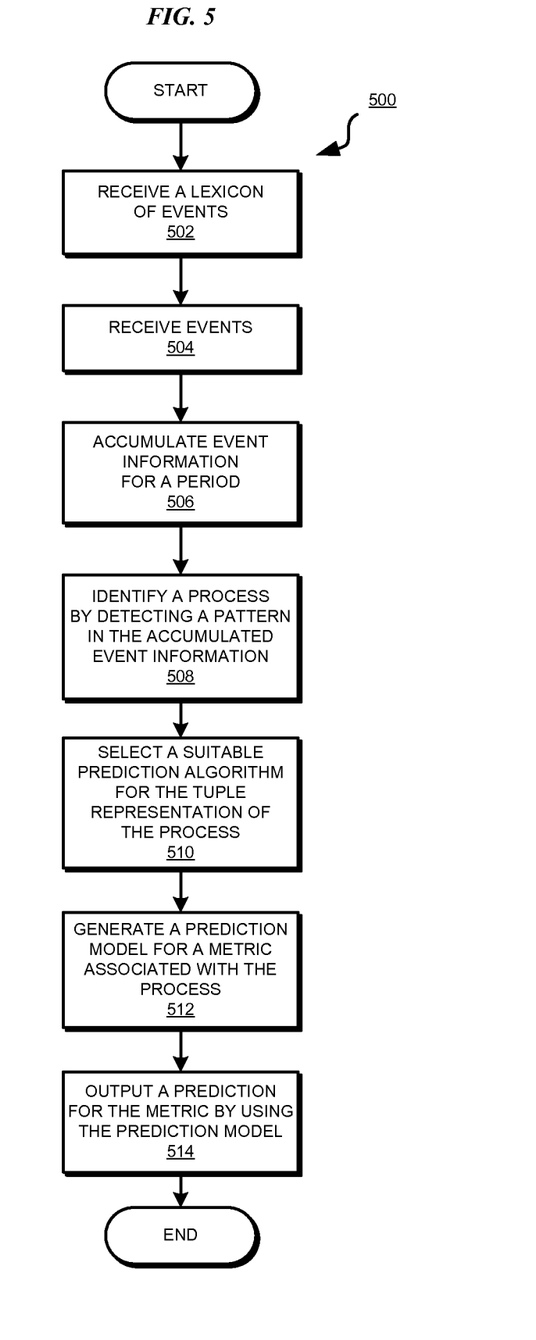
FIG. 5 depicts a flowchart of an example process for non-intrusive event-driven prediction of a metric in accordance with an illustrative embodiment.

With reference to FIG. 5, this figure depicts a flowchart of an example process for non-intrusive event-driven prediction of a metric in accordance with an illustrative embodiment. Process 500 may be implemented in a prediction application, such as prediction application 402 in FIG. 4.

Process 500 begins by receiving a lexicon of events (step 502). Process 500 then receives events (504).

Process 500 accumulates for a period of time, such as for an observation period, bookkeeping information about the events specified in the events lexicon (step 506). Process 500 identifies a process or a representation thereof, such as a tuple, by detecting a pattern in the accumulated event information (step 508).

Process 500 selects a suitable prediction algorithm for the tuple representation of the process (step 510). Process 500 generates a prediction model for a metric associated with the process (step 512). Process 500 computes and outputs a prediction for the metric by using the prediction model (step 514). Process 500 ends thereafter.

Figure 6:
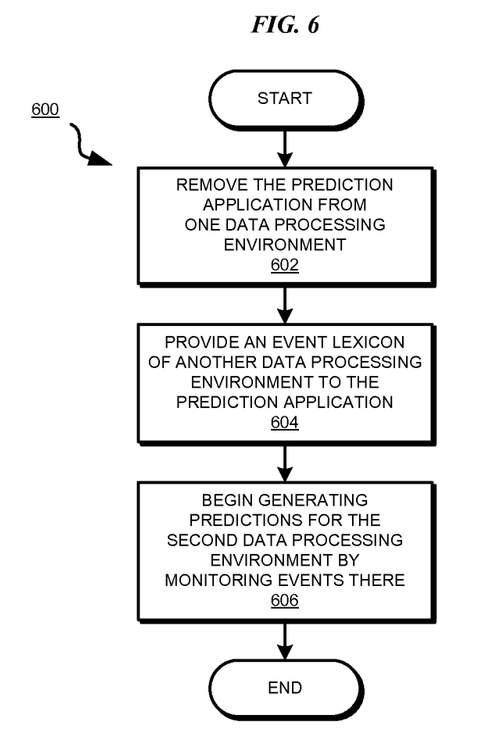
FIG. 6 depicts a flowchart of an example process of adapting a prediction model to changing processes in accordance with an illustrative embodiment.

With reference to FIG. 6, this figure depicts a flowchart of a process of adapting a non-intrusive event-driven prediction application to make new or different predictions in accordance with an illustrative embodiment. Process 600 may be implemented in a data processing environment, such as in data processing environment 100 in FIG. 1.

Process 600 begins by removing the prediction application according to an embodiment, such as prediction application 402 in FIG. 4, from one data processing environment (step 602). Step 602 is useful when an already deployed prediction application is to be reconfigured to make new or different predictions. If a new deployment of the prediction application, step 602 may be omitted.

Process 600 provides an event lexicon, such as event lexicon 408 in FIG. 4, for another data processing environment to the prediction application (step 604).

Process 600 begins generating new or different predictions for new or different metrics corresponding to new or different processes in the other data processing environment by monitoring the specified events in the other data processing environment (step 606). Process 600 ends thereafter. For example, step 606 may cause process 500 in FIG. 5 to execute with respect to a new lexicon describing the events in the other data processing environment.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for non-intrusive event-driven prediction of metrics in a data processing environment. Using an embodiment of the invention, a prediction application can be deployed in any data processing environment having any type of processes executing therein, without the prediction application having to be configured with the knowledge of the processes. Events to be observed are specified to the prediction application.

The prediction application observes the specified events, creates representations of the processes that are occurring in the data processing environment through the observed events. The prediction application selects and applies a suitable prediction model for an execution of a process. Different prediction models may be applied to different executions of same or different processes, where the pattern of events received from an execution governs the selection of the model. The prediction application produces a predicted value of a metric associated with a process instance.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for event-driven prediction of a metric in a data processing environment, the computer implemented method comprising:

observing a set of events in the data processing environment, the set of events being generated by a plurality of processes executing in the data processing environment;

tracking a subset of the set of events for an observation period, the tracking resulting in bookkeeping information about the subset of events;

detecting a pattern of events in the bookkeeping information by correlating events that pertain to a common process execution into a correlated set and detecting patterns within the correlated set;

forming the pattern as a tuple representing a process in the plurality of processes, the metric corresponding to the process;

selecting a prediction model for the tuple;

supplying the prediction model with the tuple; and executing the prediction model to generate a predicted value of the metric.

2. The computer implemented method of claim 1, further comprising:

detecting a second pattern of events in the bookkeeping information;

forming the second pattern as a second tuple also representing the process, wherein the pattern and the second pattern represent different executions of the process;

selecting a second prediction model for the second tuple;

supplying the second prediction model with the second tuple; and executing the second prediction model to generate the predicted value of the metric.

3. The computer implemented method of claim 1, wherein the pattern includes a count of occurrence of an event from the subset of events during the observation period.

4. The computer implemented method of claim 1, wherein the pattern includes a sequence of occurrence of a subset of the subset of events during the observation period.

5. The computer implemented method of claim 1, wherein the pattern includes a sequence of occurrence of a subset of the subset of events and a duration between events during the observation period.

6. The computer implemented method of claim 1, wherein a selection criterion for the selection of subset of events is specified in an events lexicon, and wherein the subset of events is usable for predicting the metric.

7. The computer implemented method of claim 6, wherein changing the events lexicon changes the subset of events, and wherein changing the events lexicon enables predicting a different metric.

8. The computer implemented method of claim 1, wherein the pattern is a changed form of an existing pattern, further comprising:

representing the pattern as a modified tuple, the modified tuple being a modification of an existing tuple, the modification representing a change in the process;

selecting a third prediction model for the modified tuple;

supplying the third prediction model with the modified tuple; and executing the third prediction model to generate the predicted value of the metric.

9. The computer implemented method of claim 1, wherein an event in the pattern of events includes additional information, and wherein the additional information is further supplied to the prediction model as a parameter.

10. The computer implemented method of claim 1, further comprising:

receiving a set of training patterns of events, each training pattern having a corresponding metric value of the metric; and training the prediction model using the set of training patterns such that for a training pattern the prediction model outputs the corresponding metric value.

* * * * *